US012600096B2

(12) United States Patent  
Nukui et al.

(10) Patent No.: US 12,600,096 B2  
(45) Date of Patent: Apr. 14, 2026

(54) GLASS MULTIPLE-PLY ROVING, RANDOM MAT FOR FORMING THERMOPLASTIC COMPOSITE MATERIAL, AND GLASS-FIBER-REINFORCED THERMOPLASTIC RESIN SHEET

(71) Applicant: NITTO BOSEKI CO., LTD., Fukushima (JP)

(72) Inventors: Yosuke Nukui, Fukushima (JP); Hideaki Monma, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 552 days.

(21) Appl. No.: 17/622,980

(22) PCT Filed: Oct. 13, 2020

(86) PCT No.: PCT/JP2020/038583  
§ 371 (c)(1),  
(2) Date: Dec. 27, 2021

(87) PCT Pub. No.: WO2021/085115  
PCT Pub. Date: May 6, 2021

(65) Prior Publication Data  
US 2022/0258435 A1 Aug. 18, 2022

(30) Foreign Application Priority Data

Oct. 29, 2019 (JP) ................................. 2019-196229

(51) Int. Cl.

| | |
|---|---|
| B29C 70/18 | (2006.01) |
| B29B 11/16 | (2006.01) |
| B29K 101/12 | (2006.01) |
| B29K 105/08 | (2006.01) |
| B29K 105/10 | (2006.01) |
| B29K 309/08 | (2006.01) |
| C03C 25/1095 | (2018.01) |
| C08J 5/04 | (2006.01) |

(52) U.S. Cl.  
CPC .............. B29C 70/18 (2013.01); B29B 11/16 (2013.01); C08J 5/043 (2013.01); B29K 2101/12 (2013.01); B29K 2105/0863 (2013.01); B29K 2105/10 (2013.01); B29K 2309/08 (2013.01); C03C 25/1095 (2013.01)

(58) Field of Classification Search  
CPC ... C08J 5/043; B32B 5/02; B32B 5/12; B32B 5/26; B32B 2260/021; B32B 2260/023; B29C 70/18; B29C 70/12; B29C 70/00; B29B 11/16; B29K 2101/12; B29K 2105/0863; B29K 2105/10; B29K 2309/08; C03C 25/1095; C03C 13/00; C03B 37/022; C03B 37/12; D06N 3/0011; D06N 3/0022; D06N 3/0086; Y10T 442/10; Y10T 428/24996; Y10T 428/249942; D03D 15/267  
See application file for complete search history.

(56) References Cited

U.S. PATENT DOCUMENTS

| | | | | |
|---|---|---|---|---|
| 5,013,771 A | * | 5/1991 | Guillet | ........................ C08J 5/08 |
| | | | | 523/213 |
| 5,910,458 A | * | 6/1999 | Beer | ..................... B29C 70/502 |
| | | | | 442/388 |
| 6,268,047 B1 | * | 7/2001 | Mulder | ................. B29C 70/081 |
| | | | | 442/238 |
| 6,911,259 B2 | | 6/2005 | Mizukami et al. | |
| 2007/0122617 A1 | | 5/2007 | Gonthier et al. | |
| 2011/0028606 A1 | * | 2/2011 | Li | ........................... C03B 37/01 |
| | | | | 501/36 |
| 2015/0284289 A1 | * | 10/2015 | Gu | ......................... C08G 71/04 |
| | | | | 524/199 |

FOREIGN PATENT DOCUMENTS

| | | | |
|---|---|---|---|
| JP | H05-301220 A | | 11/1993 |
| JP | H06-79742 A | | 3/1994 |
| JP | H10-1331 A | | 1/1998 |
| JP | 2004-025482 A | | 1/2004 |
| JP | 2004-530805 A | | 10/2004 |
| JP | 2015-157740 A | | 9/2015 |
| JP | 2017-119616 A | | 7/2017 |
| JP | 2017-177522 A | | 10/2017 |
| JP | 2017206787 A | * | 11/2017 |
| JP | 2019112286 A | * | 7/2019 |
| WO | 2018/139158 A1 | | 8/2018 |

OTHER PUBLICATIONS

Machine Translation of JP2017206787 (Year: 2017).*

* cited by examiner

*Primary Examiner* — Jennifer A Steele  
(74) *Attorney, Agent, or Firm* — Carrier, Shende & Associates P.C.; Fulchand P. Shende; Joseph P. Carrier

(57) ABSTRACT

Provided is a glass multiple-ply roving that is excellent in impregnation quality of a thermoplastic resin for a random mat and workability in production of a random mat, and can impart excellent strength to a thermoplastic composite material. The glass multiple-ply roving includes a plurality of glass strands, wherein the weight of the glass strands, S, is in the range of 64 to 210 tex, the fiber diameter of the glass strands, D, is in the range of 9.0 to 18.0 μm, the ignition loss of the glass multiple-ply roving, L, is in the range of 0.55 to 0.94%, and the S, D, and L satisfy the following formula (1):

$$4.10 \leq 1000 \times S^{1/2}/(D^3 \times L^3) \leq 7.10 \qquad (1).$$

5 Claims, No Drawings

GLASS MULTIPLE-PLY ROVING, RANDOM MAT FOR FORMING THERMOPLASTIC COMPOSITE MATERIAL, AND GLASS-FIBER-REINFORCED THERMOPLASTIC RESIN SHEET

TECHNICAL FIELD

The present invention relates to a glass multiple-ply roving, a random mat for forming a thermoplastic composite material, and a glass fiber-reinforced thermoplastic resin sheet.

BACKGROUND ART

A glass multiple-ply roving for reinforcing thermoplastic resin molded articles has been known (e.g., see Patent Literature 1). The glass multiple-ply roving described in Patent Literature 1 is used, for example, for a spray-up molding method, in which glass fiber and liquid synthetic resin are simultaneously sprayed onto a mold of predetermined shape. The spray-up molding method is configured so that a cutter is attached to a spray gun capable of spraying liquid synthetic resin, and when a glass multiple-ply roving is fed there, the glass multiple-ply roving is cut into fragments of predetermined length, and mixed in a jet flow of liquid synthetic resin and sprayed onto the mold.

A random mat for forming a thermoplastic composite material is known, in which at least one or more layers of an isotropic random mat formed by randomly dispersing the glass multiple-ply roving cut into fragments of predetermined length and one or more layers of a thermoplastic resin layer consisting of a thermoplastic resin in the form of particulates or short fiber are laminated (e.g., see Patent Literature 2).

The random mat for forming a thermoplastic composite material is impregnated with a thermoplastic resin to form a thermoplastic composite material.

CITATION LIST

Patent Literature

Patent Literature 1: Japanese Patent Laid-Open No. 10-1331
Patent Literature 2: Japanese Patent Laid-Open No. 2017-177522

SUMMARY OF INVENTION

Technical Problem

However, the conventional glass multiple-ply roving has a disadvantage that in forming a thermoplastic composite material (glass fiber-reinforced thermoplastic resin sheet) by forming the random mat and impregnating the random mat with a thermoplastic resin, the random mat is not sufficiently impregnated with the thermoplastic resin.

An object of the present invention is to provide a glass multiple-ply roving that can ensure excellent impregnation quality of a thermoplastic resin in forming a thermoplastic composite material by cutting the glass multiple-ply roving into fragments of predetermined length and dispersing them to form a random mat and then impregnating the random mat with the thermoplastic resin, by overcoming the disadvantage.

Another object of the present invention is to provide a glass multiple-ply roving that is excellent in workability in production of the random mat, and can impart excellent strength to a thermoplastic composite material formed by impregnating the random mat with a thermoplastic resin.

Still another object of the present invention is to provide a random mat for forming a thermoplastic composite material using the glass multiple-ply roving of the present invention, and a glass fiber-reinforced thermoplastic resin sheet using the glass multiple-ply roving of the present invention.

Solution to Problem

To achieve the objects, the glass multiple-ply roving of the present invention is characterized by being a glass multiple-ply roving comprising a plurality of glass strands, wherein the weight of the glass strands, S, is in the range of 64 to 210 tex, the fiber diameter of the glass strands, D, is in the range of 9.0 to 18.0 μm, the ignition loss of the glass multiple-ply roving, L, is in the range of 0.55 to 0.94%, and the S, D, and L satisfy the following formula (1).

$$4.10 \leq 1000 \times S^{1/2}/(D^3 \times L) \leq 7.10 \tag{1}$$

By virtue of the configuration that the S, D, and L satisfy the formula (1), the glass multiple-ply roving of the present invention can ensure excellent impregnation quality of a thermoplastic resin in forming a thermoplastic composite material by cutting the glass multiple-ply roving into fragments of predetermined length and dispersing them to form a random mat and then impregnating the random mat with the thermoplastic resin, is excellent in workability in production of the random mat, and can impart excellent strength to a thermoplastic composite material formed by impregnating the random mat with a thermoplastic resin. Here, the phrase "excellent in workability in production of a random mat for a thermoplastic composite material" means being excellent in dispersibility in depositing on a belt conveyer after cutting into fragments with a length in the above range. The phrase "imparting excellent strength to a thermoplastic composite material" means imparting a bending elastic modulus of 12.5 GPa or higher and a bending strength of 365 MPa or higher to the thermoplastic composite material in the case that the glass content of the thermoplastic composite material is 60.0% or more.

It is preferable for the glass multiple-ply roving of the present invention that the S, D, and L satisfy the following formula (2).

$$4.15 \leq 1000 \times S^{1/2}/(D^3 \times L^3) \leq 6.89 \tag{2}$$

It is preferable for the glass multiple-ply roving of the present invention that the fiber diameter, D, be in the range of 13.5 to 17.5 μm.

It is preferable for the glass multiple-ply roving of the present invention to have a length in the range of 1 to 150 mm and be used for production of a random mat for forming a thermoplastic composite material, the random mat comprising a thermoplastic resin.

The random mat of the present invention for forming a thermoplastic composite material is characterized by comprising the glass multiple-ply roving of the present invention and a thermoplastic resin.

The glass fiber-reinforced thermoplastic resin sheet of the present invention is characterized by comprising the glass multiple-ply roving of the present invention and a thermoplastic resin.

DESCRIPTION OF EMBODIMENTS

Next, embodiments of the present invention will be described in more detail.

The glass multiple-ply roving of the present embodiment is a glass multiple-ply roving comprising a plurality of glass strands, wherein the weight of the glass strands, S, is in the range of 64 to 210 tex (g/km), the fiber diameter of the glass strands, D, is in the range of 9.0 to 18.0 μm, the ignition loss of the glass multiple-ply roving, L, is in the range of 0.55 to 0.94%, and the S, D, and L satisfy the following formula (1).

$$4.10 \leq 1000 \times S^{1/2}/(D^3 \times L^3) \leq 7.10 \qquad (1)$$

The glass multiple-ply roving of the present embodiment can be produced, for example, as follows.

First, a glass raw material (glass batch) prepared to have a predetermined glass composition based on components contained in ores to be the glass raw material and the contents of the components and the amounts of the components to be volatilized in the melting process is fed to a melting furnace and melted, for example, at a temperature in the range of 1450 to 1550° C.

Then, the melted glass batch (molten glass) is drawn from 50 to 4000 nozzle tips of a bushing controlled at a predetermined temperature, and rapidly cooled to form glass filaments, onto which a binder is applied, and 50 to 4000 glass filaments are bundled together and wound around a tube to obtain glass strands, and 2 to 40 strands of the glass strands are paralleled while being unraveled from the tube, thereby providing a glass multiple-ply roving. Here, allowing each of the nozzle tips to have a non-circular shape and to have a protrusion or a notch for rapidly cooling the molten glass and controlling the temperature condition can provide glass filaments having a flat cross-sectional shape.

Examples of the glass composition that the glass multiple-ply roving of the present embodiment may employ can include the most common E glass composition (a composition including, in terms of oxides, $SiO_2$ in the range of 52.0 to 56.0 wt %, $Al_2O_3$ in the range of 12.0 to 16.0 wt %, MgO and CaO in the range of 20.0 to 25.0 wt % in total, and $B_2O_3$ in the range of 5.0 to 10.0 wt %, with respect to the total amount of the glass fiber), a high-strength and high-modulus glass composition (a composition including $SiO_2$ in the range of 64.0 to 66.0 wt %, $Al_2O_3$ in the range of 24.0 to 26.0 wt %, and MgO in the range of 9.0 to 11.0 wt %, with respect to the total amount of the glass fiber), a high-modulus and easily producible glass composition (a composition including $SiO_2$ in the range of 57.0 to 60.0 wt %, $Al_2O_3$ in the range of 17.5 to 20.0 wt %, MgO in the range of 8.5 to 12.0 wt %, CaO in the range of 10.0 to 13.0 wt %, $B_2O_3$ in the range of 0.5 to 1.5 wt %, with the total amount of $SiO_2$, $Al_2O_3$, MgO, and CaO being 98.0 wt % or more, with respect to the total amount of the glass fiber), and a low-dielectric-constant and low-dielectric-tangent glass composition (a composition including $SiO_2$ in the range of 48.0 to 62.0 wt %, $B_2O_3$ in the range of 17.0 to 26.0 wt %, $Al_2O_3$ in the range of 9.0 to 18.0 wt %, CaO in the range of 0.1 to 9.0 wt %, MgO in the range of 0 to 6.0 wt %, $Na_2O$, $K_2O$, and $Li_2O$ in the range of 0.05 to 0.5 wt % in total, $TiO_2$ in the range of 0 to 5.0 wt %, SrO in the range of 0 to 6.0 wt %, $F_2$ and $Cl_2$ in the range of 0 to 3.0 wt % in total, and $P_2O_5$ in the range of 0 to 6.0 wt %, with respect to the total amount of the glass fiber).

Regarding measurement of the content of each component described above in the glass fiber contained in the glass fiber-reinforced resin molded article of the present embodiment, the content of Li as a light element can be measured with an ICP emission spectroscopic analyzer, and the contents of other elements can be measured with a wavelength-dispersive X-ray fluorescence analyzer.

The measurement method is as follows. First, a glass batch (prepared by mixing glass raw material) or glass fiber (when organic matter attaches to the surface of the glass fiber, or when the glass fiber is mainly contained as a reinforcing material in organic matter (resin), the glass fiber is used after the organic matter is removed by, for example, heating for about 0.5 to 24 hours in a muffle furnace at 300 to 650° C.) is placed in a platinum crucible and melted with stirring while being held at a temperature of 1600° C. for 6 hours in an electric furnace to obtain homogeneous molten glass. Next, the obtained molten glass is poured onto a carbon plate to produce a glass cullet, which is then powdered by pulverizing. For Li as a light element, the glass powder is thermally decomposed with an acid and then quantitatively analyzed by using an ICP emission spectroscopic analyzer. For other elements, the glass powder is molded into a disc shape by a pressing machine and then quantitatively analyzed by using a wavelength-dispersive X-ray fluorescence analyzer. These quantitative analysis results are converted in terms of oxides to calculate the content of each component and the total amount, and the above-described content (% by mass) of each component can be determined from these numerical values.

In the glass multiple-ply roving of the present embodiment, the fiber diameter of the glass strands, D, is in the range of 9.0 to 18.0 μm. For excellent productivity of the glass multiple-ply roving, the fiber diameter of the glass strands, D, is preferably in the range of 13.5 to 17.5 μm, and more preferably in the range of 14.5 to 16.5 μm. The fiber diameter of the glass strands, D, refers to the diameter of the glass filaments constituting the glass strands. Here, the cross-sectional shape of the glass filaments is typically true circle shape, but may be any shape except true circle shape and generally true circle shape (e.g., oval shape, long-oval shape). In the case that the cross-sectional shape of the glass filaments is any shape except true circle shape and generally true circle shape, the fiber diameter of the glass strands, D, refers to the diameter of a true circle having an area equal to the area of the cross-sectional shape (referred to as reduced fiber diameter).

For calculation of the diameter of the glass filaments, for example, the glass strand is embedded in resin such as epoxy resin and the resin is cured, the cross section is polished, and the following procedure is then performed by using an electron microscope: if the cross-sectional shape of each of 100 or more glass filaments is true circle shape or generally true circle shape, the diameters are measured; if the cross-sectional shape of each of the glass filaments is any shape except true circle shape and generally true circle shape, the cross-sectional areas are calculated in advance and the reduced fiber diameters are calculated on the basis of the cross-sectional areas; and then the average value of the diameters or reduced fiber diameters measured or calculated is calculated to give the diameter of the glass filaments. Alternatively, the measurement can be carried out by image processing using an automated analyzer for an image obtained with an electron microscope. For calculation of the diameter of the glass filaments in the case that the glass multiple-ply roving of the present embodiment or cut fragments thereof are contained in a glass fiber-reinforced resin molded article, for example, the cross section of the glass fiber-reinforced resin molded article is first polished, and the following procedure is then performed by using an electron microscope: if the cross-sectional shape of each of 100 or more glass filaments is true circle shape or generally true circle shape, the diameters are measured; if the cross-sectional shape of each of the glass filaments is any shape except true circle shape and generally true circle shape, the cross-sectional areas are calculated in advance and the reduced fiber diameters are calculated on the basis of the cross-sectional areas; and then the average value of the diameters or reduced fiber diameters measured or calculated is calculated to give the diameter of the glass filaments.

In the glass multiple-ply roving of the present embodiment, the glass strands each comprise the glass filaments bundled together in a quantity in the range of 50 to 4000 filaments, preferably each comprise the glass filaments bundled together in a quantity in the range of 75 to 800 filaments, and more preferably each comprise the glass filaments bundled together in a quantity in the range of 100 to 600 filaments.

In the glass multiple-ply roving of the present embodiment, the weight of the glass strands, S, is in the range of 64 to 210 tex, preferably in the range of 70 to 180 tex, more preferably in the range of 75 to 160 tex, and further preferably in the range of 81 to 143 tex.

The weight of the glass strands, S, can be measured, for example, for a single glass strand separated and removed from the multiple-ply roving in accordance with JIS R 3420: 2013. The glass multiple-ply roving of the present embodiment comprises, for example, 2 to 300 glass strands, preferably comprises 4 to 100 glass strands, more preferably comprises 6 to 50 glass strands, and further preferably comprises 12 to 36 glass strands. In the glass multiple-ply roving of the present embodiment, the glass strands in the quantity may be twisted or paralleled, but it is preferable from the viewpoint of dispersibility in depositing on a belt conveyer that the glass strands be paralleled.

The weight of the glass multiple-ply roving of the present embodiment is, for example, in the range of 400 to 20000 tex, preferably in the range of 1000 to 5500 tex, and more preferably in the range of 1800 to 3400 tex. Here, the weight of the glass multiple-ply roving can be measured in accordance with JIS R 3420: 2013.

The ignition loss of the glass multiple-ply roving of the present embodiment, L, is in the range of 0.55 to 0.94%, preferably in the range of 0.60 to 0.93%, more preferably in the range of 0.65 to 0.92%, further preferably in the range of 0.70 to 0.91%, and particularly preferably in the range of 0.75 to 0.90%. Here, the ignition loss of the glass multiple-ply roving of the present embodiment, L, can be measured in accordance with JIS R 3420: 2013.

The ignition loss of the glass multiple-ply roving, L, indicates the amount of the binder attached in the glass multiple-ply roving. The binder is provided to glass fiber, for example, for the purpose of improvement of adhesiveness between glass fiber and resin and improvement of uniform dispersibility of glass fiber in a mixture of glass fiber and resin or inorganic material. Examples of components of the binder to be used for the glass multiple-ply roving of the present embodiment include a silane coupling agent and a film former.

The film former is organic matter to cover the surface of glass fiber, and examples of such organic matter can include urethane resin, epoxy resin, vinyl acetate resin, acrylic resin, modified polypropylene (in particular, carboxylic acid-modified polypropylene), and copolymers of a (poly)carboxylic acid (in particular, maleic acid) and an unsaturated monomer.

Examples of the silane coupling agent include aminosilanes (such as γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane), chlorosilanes (such as γ-chloropropyltrimethoxysilane), epoxysilanes (such as γ-glycidoxypropyltrimethoxysilane and β-(3,4-epoxycyclo-hexyl)ethyltrimethoxysilane), mercaptosilanes (such as γ-mercaptotrimethoxysilane), vinylsilanes (such as vinylt-rimethoxysilane and N-β-(N-vinylbenzylaminoethyl)-γ-aminopropyltrimethoxysilane), acrylsilanes (such as γ-methacryloxypropyltrimethoxysilane), cationic silanes (such as N-(vinylbenzyl)-2-aminoethyl-3-aminopropylt-rimethoxysilane hydrochloride and N-phenyl-3-aminopro-pyltrimethoxysilane hydrochloride), and methacrylsilanes (such as 3-methacryloxypropylmethyldimethoxysilane, 3-methacryloxypropyltrimethoxysilane, 3-methacryloxy-propylmethyldiethoxysilane, and 3-methacryloxypropyltri-ethoxysilane). As the silane coupling agent, these compounds can be used singly or in combination of two or more.

The binder to be used for the glass multiple-ply roving of the present embodiment may contain a lubricant, a surfactant, an antistatic agent, and so on, in addition to the silane coupling agent and the film former.

Examples of the lubricant include modified silicone oil, animal oils (such as beef tallow) and hydrogenated products thereof, vegetable oils (such as soybean oil, coconut oil, rapeseed oil, palm oil, and castor oil) and hydrogenated products thereof, animal waxes (such as beeswax and lanolin), vegetable waxes (such as candelilla wax and carnauba wax), mineral waxes (such as paraffin wax and montan wax), condensates of a higher saturated fatty acid and a higher saturated alcohol (such as stearates such as lauryl stearate), polyethyleneimine, polyalkylpolyamine alkylamide derivatives, fatty acid amides (e.g., dehydrated condensates of polyethylenepolyamine such as diethylenetriamine, triethyl-enetetramine, and tetraethylenepentamine and fatty acid such as lauric acid, myristic acid, palmitic acid, and stearic acid), and quaternary ammonium salts (such as alkyltrim-ethylammonium salts such as lauryltrimethylammonium chloride). As the lubricant, these can be used singly or in combination of two or more.

Examples of the surfactant include nonionic surfactants, cationic surfactants, anionic surfactants, and amphoteric surfactants. As the surfactant, these compounds can be used singly or in combination of two or more.

Examples of the nonionic surfactant include ethylene oxide propylene oxide alkyl ether, polyoxyethylene alkyl ether, polyoxyethylene-polyoxypropylene-block copolymer, alkyl polyoxyethylene-polyoxypropylene-block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adducts, polyoxyethylene castor oil ether, hydrogenated castor oil ethylene oxide adducts, alkylamine ethylene oxide adducts, fatty acid amide ethyl-ene oxide adducts, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, an ethylene oxide adduct of acetylene glycol, and an ethylene oxide adduct of acetylene alcohol.

Examples of the cationic surfactant include alkyldimeth-ylbenzylammonium chloride, alkyltrimethylammonium chloride, alkyldimethylethylammonium ethylsulfate, higher alkylamine salts (such as acetate and hydrochloride), adducts of ethylene oxide to a higher alkylamine, condensates of a higher fatty acid and polyalkylene polyamine, salts of an ester of a higher fatty acid and alkanolamine, salts of a higher fatty acid amide, imidazoline cationic surfactant, and alkyl pyridinium salts.

Examples of the anionic surfactant include higher alcohol sulfate salts, higher alkyl ether sulfate salts, α-olefin sulfate salts, alkylbenzene sulfonate salts, α-olefin sulfonate salts, reaction products of a fatty acid halide and N-methyl taurine, dialkyl sulfosuccinate salts, higher alcohol phosphate ester salts, and phosphate ester salts of higher alcohol ethylene oxide adducts.

Examples of the amphoteric surfactant include amino acid amphoteric surfactants such as alkali metal salts of alkylaminopropionic acid, betaine amphoteric surfactants such as alkyldimethylbetaine, and imidazoline amphoteric surfactants.

The binder to be used for the glass multiple-ply roving of the present embodiment may contain 30 to 90 wt % of the film former, 5 to 50 wt % of the silane coupling agent, and 5 to 50 wt % of other components, in terms of solid contents. The components and composition ratio of the binder to be used for the glass multiple-ply roving of the present embodiment can be analyzed by GC-MS.

In the glass multiple-ply roving of the present embodiment, the S, D, and L satisfy the following formula (1), preferably satisfy the following formula (2), more preferably satisfy the following formula (3), and further preferably satisfy the following formula (4).

$$4.10 \leq 1000 \times S^{1/2}/(D^3 \times L^3) \leq 7.10 \tag{1}$$

$$4.15 \leq 1000 \times S^{1/2}/(D^3 \times L^3) \leq 6.89 \tag{2}$$

$$4.17 \leq 1000 \times S^{1/2}/(D^3 \times L^3) \leq 6.20 \tag{3}$$

$$4.50 \leq 1000 \times S^{1/2}/(D^3 \times L^3) \leq 6.10 \tag{4}$$

By virtue of the configuration that the glass multiple-ply roving of the present embodiment satisfies the formula (2), the glass multiple-ply roving of the present embodiment is particularly excellent in dispersibility in depositing on a belt conveyer after cutting the glass multiple-ply roving. By virtue of the configuration that the glass multiple-ply roving of the present embodiment satisfies the formula (2), the glass multiple-ply roving of the present embodiment can ensure particularly excellent impregnation quality of a thermoplastic resin in forming a thermoplastic composite material by impregnating a random mat for a thermoplastic composite material with the thermoplastic resin. Further, by virtue of the configuration that the glass multiple-ply roving of the present embodiment satisfies the formula (2), the glass multiple-ply roving of the present embodiment can impart a bending elastic modulus of 13.3 GPa or higher and a bending strength of 400 MPa or higher to the thermoplastic composite material in the case that the glass content of the thermoplastic composite material is 60.0% or more.

By virtue of the configuration that the glass multiple-ply roving of the present embodiment satisfies the formula (3), the glass multiple-ply roving of the present embodiment is particularly excellent in dispersibility in depositing on a belt conveyer after cutting the glass multiple-ply roving. By virtue of the configuration that the glass multiple-ply roving of the present embodiment satisfies the formula (3), the glass multiple-ply roving of the present embodiment can ensure particularly excellent impregnation quality of a thermoplastic resin in forming a thermoplastic composite material by impregnating a random mat for a thermoplastic composite material with the thermoplastic resin. Further, by virtue of the configuration that the glass multiple-ply roving of the present embodiment satisfies the formula (3), the glass multiple-ply roving of the present embodiment can impart a bending elastic modulus of 13.5 GPa or higher and a bending strength of 410 MPa or higher to the thermoplastic composite material in the case that the glass content of the thermoplastic composite material is 60.0% or more.

By virtue of the configuration that the glass multiple-ply roving of the present embodiment satisfies the formula (4), the glass multiple-ply roving of the present embodiment is particularly excellent in dispersibility in depositing on a belt conveyer after cutting the glass multiple-ply roving. By virtue of the configuration that the glass multiple-ply roving of the present embodiment satisfies the formula (4), the glass multiple-ply roving of the present embodiment can ensure particularly excellent impregnation quality of a thermoplastic resin in forming a thermoplastic composite material by impregnating a random mat for a thermoplastic composite material with the thermoplastic resin. Further, by virtue of the configuration that the glass multiple-ply roving of the present embodiment satisfies the formula (4), the glass multiple-ply roving of the present embodiment can impart a bending elastic modulus of 13.5 GPa or higher and a bending strength of 415 MPa or higher to the thermoplastic composite material in the case that the glass content of the thermoplastic composite material is 60.0% or more.

The glass multiple-ply roving of the present embodiment is cut with a known method to be provided with a length in the range of 1 to 150 mm, and used for production of a random mat for forming a thermoplastic composite material.

After being cut into fragments each having a length in the range of 1 to 150 mm, for example, the glass multiple-ply roving of the present embodiment is deposited on a belt conveyer to form an isotropic random mat, and a thermoplastic resin in the form of particulates or short fiber is sprayed thereon to form a thermoplastic resin; by repeating such operations, a random mat for a thermoplastic composite material can be produced, the random mat including at least one or more layers of the isotropic random mat and at least one or more layers of the thermoplastic resin layer. A thermoplastic composite material (glass fiber-reinforced thermoplastic resin sheet) can be produced through press molding of a product formed of one layer of the random mat for a thermoplastic composite material or a laminate of a plurality of layers of the random mat for a thermoplastic composite material, followed by impregnation of the resultant with a thermoplastic resin.

The glass multiple-ply roving of the present embodiment is excellent in workability in production of the random mat for a thermoplastic composite material, can ensure excellent impregnation quality of a thermoplastic resin in forming a thermoplastic composite material by impregnating the random mat for a thermoplastic composite material with the thermoplastic resin, and can impart excellent strength to the thermoplastic composite material.

For example, the glass multiple-ply roving of the present embodiment allows production of a glass fiber-reinforced thermoplastic resin sheet also by impregnating with a thermoplastic resin while a plurality of glass multiple-ply rovings are paralleled in one direction to integrate the glass multiple-ply rovings together.

In the glass fiber-reinforced thermoplastic resin sheet of the present embodiment, the glass content (the proportion of the weight of glass fiber to the weight of the glass fiber-reinforced thermoplastic resin sheet) may employ, for example, the range of 45.0 to 80.0% by mass.

Next, Examples and Comparative Examples of the glass multiple-ply roving of the present invention will be demonstrated.

EXAMPLES

Example 1

In the present Example, first, a glass raw material (glass batch) prepared to have the E glass composition was fed to a melting furnace and melted, and the melted glass batch (molten glass) was drawn from nozzle tips of a bushing controlled at a predetermined temperature, and rapidly cooled to form glass filaments, to which a binder containing a film former, a silane coupling agent, a lubricant, and a surfactant was applied, and 210 glass filaments were bundled together and wound around a tube to obtain glass strands with a weight, S, of 93 tex and a fiber diameter, D, of 15.0 μm. Subsequently, 24 glass strands were paralleled while being unraveled from the tube, thereby providing a glass multiple-ply roving with an ignition loss, L, of 0.80% and a weight of 2240 tex.

Table 1 shows the weight of the glass strands, S, forming the glass multiple-ply roving obtained in the present Example, the fiber diameter of the glass strands, D, the ignition loss of the glass multiple-ply roving, L, the value of $1000 \times S^{1/2}/(D^3 \times L^3)$, and the weight of the glass multiple-ply roving.

Next, the glass multiple-ply roving obtained in the present Example was cut into fragments of 50 mm in length, and polyamide resin powder (manufactured by TORAY INDUSTRIES, INC., product name: 1001P) was sprayed thereon with randomly dispersing to obtain a random mat for a thermoplastic composite material. Thirteen layers of the resulting random mat for a thermoplastic composite material were laminated, and pressed with a high-temperature pressing machine under conditions with a temperature of 250° C. and a pressure time of 10 minutes to obtain a laminated sheet of Example 1 (glass fiber-reinforced thermoplastic resin sheet). The glass content of the resulting laminated sheet of Example 1 was 60.0% by mass. The dispersibility in depositing on a belt conveyer after cutting the glass multiple-ply roving obtained in the present Example into fragments with a length in the above range, the impregnation quality of the resin in production of the laminated sheet, the bending elastic modulus of the laminated sheet, the bending strength of the laminated sheet, and the productivity of the glass multiple-ply roving were evaluated or measured as follows. Table 1 shows the results.

[Dispersibility in Cutting Glass Multiple-Ply Roving]

The dispersibility in cutting a glass multiple-ply roving was evaluated through visual observation of the glass multiple-ply roving that had been cut into fragments of 50 mm in length and dispersed in a plane, and rated as "A" if the cut glass fragments were dispersed without tangling together and no cotton-like fluff was generated, as "B" if the cut glass fragments were not tangling together but cotton-like fluff was generated, and as "C" if the cut glass fragments were tangled together and a mass of glass was generated.

[Impregnation Quality of Resin in Production of Laminated Sheet]

Each laminated sheet obtained in Examples and Comparative Examples was evaluated, and rated as "A" if any part where the glass was transparent without impregnation with the resin was not left in the laminated sheet, as "B" if parts where the glass was transparent without impregnation with the resin accounted for less than 10% of the total in the laminated sheet, and as "C" if parts where the glass was transparent without impregnation with the resin were left to occupy 10% or more of the total in the laminated sheet.

[Bending Strength and Elastic Modulus of Laminated Sheet]

The bending strength and elastic modulus of each laminated sheet were measured with use of a precision universal tester (manufactured by Shimadzu Corporation, product name: Autograph AG-5000B) in accordance with JIS K 7017: 1999 (Method A, test specimens of Class II).

[Productivity of Glass Multiple-Ply Roving]

For productivity, each glass multiple-ply roving was evaluated on thread jamming in paralleling glass strands from a tube, and rated as "A" if no thread jamming occurred in winding 18 kg of the roving, and as "B" if thread jamming occurred.

Example 2

In the present Example, a glass multiple-ply roving with an ignition loss, L, of 0.80% and a weight of 4800 tex was obtained in the completely same manner as in Example 1 except that 200 glass filaments were bundled together, the weight of the glass strands, S, and the fiber diameter thereof, D, were set to 100 tex and 16.0 μm, respectively, and 48 glass strands were paralleled.

Table 1 shows the weight of the glass strands, S, forming the glass multiple-ply roving obtained in the present Example, the fiber diameter of the glass strands, D, the ignition loss of the glass multiple-ply roving, L, the value of $1000 \times S^{1/2}/(D^3 \times L^3)$, and the weight of the glass multiple-ply roving.

Next, a laminated sheet (glass fiber-reinforced thermoplastic resin sheet) was produced in the completely same manner as in Example 1 except that the glass multiple-ply roving obtained in the present Example was used, and the dispersibility in depositing on a belt conveyer after cutting the glass multiple-ply roving into fragments with a length in the above range, the impregnation quality of the resin in production of the laminated sheet, the bending elastic modulus of the laminated sheet, the bending strength of the laminated sheet, and the productivity of the glass multiple-ply roving were evaluated or measured in the completely same manner as in Example 1. Table 1 shows the results.

Example 3

In the present Example, a glass multiple-ply roving with a weight of 2240 tex was obtained in the completely same manner as in Example 1 except that the ignition loss, L, was set to 0.88%.

Table 1 shows the weight of the glass strands, S, forming the glass multiple-ply roving obtained in the present Example, the fiber diameter of the glass strands, D, the ignition loss of the glass multiple-ply roving, L, the value of $1000 \times S^{1/2}/(D^3 \times L^3)$, and the weight of the glass multiple-ply roving.

Next, a laminated sheet (glass fiber-reinforced thermoplastic resin sheet) was produced in the completely same manner as in Example 1 except that the glass multiple-ply roving obtained in the present Example was used, and the dispersibility in depositing on a belt conveyer after cutting the glass multiple-ply roving into fragments with a length in the above range, the impregnation quality of the resin in production of the laminated sheet, the bending elastic modulus of the laminated sheet, the bending strength of the laminated sheet, and the productivity of the glass multiple-ply roving were evaluated or measured in the completely same manner as in Example 1. Table 1 shows the results.

Example 4

In the present Example, a glass multiple-ply roving with an ignition loss, L, of 0.80% and a weight of 2240 tex was obtained in the completely same manner as in Example 1 except that 310 glass filaments were bundled together, the weight of the glass strands, S, was set to 140 tex, and 16 glass strands were paralleled.

Table 1 shows the weight of the glass strands, S, forming the glass multiple-ply roving obtained in the present Example, the fiber diameter of the glass strands, D, the ignition loss of the glass multiple-ply roving, L, the value of $1000 \times S^{1/2}/(D^3 \times L^3)$, and the weight of the glass multiple-ply roving.

Next, a laminated sheet (glass fiber-reinforced thermoplastic resin sheet) was produced in the completely same manner as in Example 1 except that the glass multiple-ply roving obtained in the present Example was used, and the dispersibility in depositing on a belt conveyer after cutting the glass multiple-ply roving into fragments with a length in the above range, the impregnation quality of the resin in production of the laminated sheet, the bending elastic modulus of the laminated sheet, the bending strength of the laminated sheet, and the productivity of the glass multiple-ply roving were evaluated or measured in the completely same manner as in Example 1. Table 1 shows the results.

Example 5

In the present Example, a glass multiple-ply roving with a weight of 2240 tex was obtained in the completely same manner as in Example 1 except that the ignition loss, L, was set to 0.74%.

Table 1 shows the weight of the glass strands, S, forming the glass multiple-ply roving obtained in the present Example, the fiber diameter of the glass strands, D, the ignition loss of the glass multiple-ply roving, L, the value of $1000 \times S^{1/2}/(D^3 \times L^3)$, and the weight of the glass multiple-ply roving.

Next, a laminated sheet (glass fiber-reinforced thermoplastic resin sheet) was produced in the completely same manner as in Example 1 except that the glass multiple-ply roving obtained in the present Example was used, and the dispersibility in depositing on a belt conveyer after cutting the glass multiple-ply roving into fragments with a length in the above range, the impregnation quality of the resin in production of the laminated sheet, the bending elastic modulus of the laminated sheet, the bending strength of the laminated sheet, and the productivity of the glass multiple-ply roving were evaluated or measured in the completely same manner as in Example 1. Table 1 shows the results.

Example 6

In the present Example, a glass multiple-ply roving with a weight of 2240 tex was obtained in the completely same manner as in Example 1 except that 320 glass filaments were bundled together, and the fiber diameter, D, and the ignition loss, L, were set to 12.0 μm and 0.93%, respectively.

Table 1 shows the weight of the glass strands, S, forming the glass multiple-ply roving obtained in the present Example, the fiber diameter of the glass strands, D, the ignition loss of the glass multiple-ply roving, L, the value of $1000 \times S^{1/2}/(D^3 \times L^3)$, and the weight of the glass multiple-ply roving.

Next, a laminated sheet (glass fiber-reinforced thermoplastic resin sheet) was produced in the completely same manner as in Example 1 except that the glass multiple-ply roving obtained in the present Example was used, and the dispersibility in depositing on a belt conveyer after cutting the glass multiple-ply roving into fragments with a length in the above range, the impregnation quality of the resin in production of the laminated sheet, the bending elastic modulus of the laminated sheet, the bending strength of the laminated sheet, and the productivity of the glass multiple-ply roving were evaluated or measured in the completely same manner as in Example 1. Table 1 shows the results.

Comparative Example 1

In the present Comparative Example, a glass multiple-ply roving with an ignition loss, L, of 0.80% and a weight of 2240 tex was obtained in the completely same manner as in Example 1 except that 630 glass filaments were bundled together, the weight of the glass strands, S, was set to 280 tex, and 8 glass strands were paralleled.

Table 1 shows the weight of the glass strands, S, forming the glass multiple-ply roving obtained in the present Comparative Example, the fiber diameter of the glass strands, D, the ignition loss of the glass multiple-ply roving, L, the value of $1000 \times S^{1/2}/(D^3 \times L^3)$, and the weight of the glass multiple-ply roving.

Next, a laminated sheet (glass fiber-reinforced thermoplastic resin sheet) was produced in the completely same manner as in Example 1 except that the glass multiple-ply roving obtained in the present Comparative Example was used, and the dispersibility in depositing on a belt conveyer after cutting the glass multiple-ply roving into fragments with a length in the above range, the impregnation quality of the resin in production of the laminated sheet, the bending elastic modulus of the laminated sheet, the bending strength of the laminated sheet, and the productivity of the glass multiple-ply roving were evaluated or measured in the completely same manner as in Example 1. Table 1 shows the results.

Comparative Example 2

In the present Comparative Example, a glass multiple-ply roving with an ignition loss, L, of 0.80% and a weight of 2240 tex was obtained in the completely same manner as in Example 1 except that 80 glass filaments were bundled together, the weight of the glass strands, S, was set to 34 tex, and 66 glass strands were paralleled.

Table 1 shows the weight of the glass strands, S, forming the glass multiple-ply roving obtained in the present Comparative Example, the fiber diameter of the glass strands, D, the ignition loss of the glass multiple-ply roving, L, the value of $1000 \times S^{1/2}/(D^3 \times L^3)$, and the weight of the glass multiple-ply roving.

Next, a laminated sheet (glass fiber-reinforced thermoplastic resin sheet) was produced in the completely same manner as in Example 1 except that the glass multiple-ply roving obtained in the present Comparative Example was used, and the dispersibility in depositing on a belt conveyer after cutting the glass multiple-ply roving into fragments with a length in the above range, the impregnation quality of the resin in production of the laminated sheet, the bending elastic modulus of the laminated sheet, the bending strength of the laminated sheet, and the productivity of the glass multiple-ply roving were evaluated or measured in the completely same manner as in Example 1. Table 1 shows the results.

Comparative Example 3

In the present Comparative Example, a glass multiple-ply roving with a weight of 2240 tex was obtained in the completely same manner as in Example 4 except that the ignition loss, L, was set to 0.15%.

Table 1 shows the weight of the glass strands, S, forming the glass multiple-ply roving obtained in the present Comof the laminated sheet, and the productivity of the glass multiple-ply roving were evaluated or measured in the completely same manner as in Example 1. Table 1 shows the results.

TABLE 1

| | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Weight of glass strands, S (tex) | 93 | 100 | 93 | 140 | 93 | 93 | 280 | 34 | 140 | 140 |
| Fiber diameter of glass strands, D (μm) | 15.0 | 16.0 | 15.0 | 15.0 | 15.0 | 12.0 | 15.0 | 15.0 | 15.0 | 15.0 |
| Ignition loss of glass multiple-ply roving, L (%) | 0.80 | 0.80 | 0.88 | 0.80 | 0.74 | 0.93 | 0.80 | 0.80 | 0.15 | 1.30 |
| $1000 \times S^{1/2}/(D^3 \times L^3)$ | 5.58 | 4.77 | 4.19 | 6.85 | 7.05 | 6.94 | 9.68 | 3.37 | 1038.76 | 1.60 |
| Weight of glass multiple-ply roving (tex) | 2240 | 4800 | 2240 | 2240 | 2240 | 2240 | 2240 | 2240 | 2240 | 2240 |
| Dispersibility (in cutting glass multiple-ply roving) | A | A | A | A | B | A | A | B | C | A |
| Impregnation quality (in production of laminated sheet) | A | A | A | A | B | B | C | C | C | C |
| Bending elastic modulus (GPa) (of laminated sheet) | 13.5 | 13.5 | 13.5 | 13.5 | 13.1 | 13.0 | 11.5 | 10.5 | 10.0 | 12.0 |
| Bending strength (MPa) (of laminated sheet) | 430 | 420 | 410 | 405 | 395 | 390 | 330 | 300 | 295 | 340 |
| Productivity of glass multiple-ply roving | A | A | A | A | A | B | A | A | A | A | parative Example, the fiber diameter of the glass strands, D, the ignition loss of the glass multiple-ply roving, L, the value of $1000 \times S^{1/2}/(D^3 \times L^3)$, and the weight of the glass multiple-ply roving.

Next, a laminated sheet (glass fiber-reinforced thermoplastic resin sheet) was produced in the completely same manner as in Example 1 except that the glass multiple-ply roving obtained in the present Comparative Example was used, and the dispersibility in depositing on a belt conveyer after cutting the glass multiple-ply roving into fragments with a length in the above range, the impregnation quality of the resin in production of the laminated sheet, the bending elastic modulus of the laminated sheet, the bending strength of the laminated sheet, and the productivity of the glass multiple-ply roving were evaluated or measured in the completely same manner as in Example 1. Table 1 shows the results.

Comparative Example 4

In the present Comparative Example, a glass multiple-ply roving with a weight of 2240 tex was obtained in the completely same manner as in Example 4 except that the ignition loss, L, was set to 1.30%.

Table 1 shows the weight of the glass strands, S, forming the glass multiple-ply roving obtained in the present Comparative Example, the fiber diameter of the glass strands, D, the ignition loss of the glass multiple-ply roving, L, the value of $1000 \times S^{1/2}/(D^3 \times L^3)$, and the weight of the glass multiple-ply roving.

Next, a laminated sheet (glass fiber-reinforced thermoplastic resin sheet) was produced in the completely same manner as in Example 1 except that the glass multiple-ply roving obtained in the present Comparative Example was used, and the dispersibility in depositing on a belt conveyer after cutting the glass multiple-ply roving into fragments with a length in the above range, the impregnation quality of the resin in production of the laminated sheet, the bending elastic modulus of the laminated sheet, the bending strength As is revealed from Table 1, it is clear that the glass multiple-ply rovings of Examples 1 to 6, each of which is such that the weight of the glass strands, S, is in the range of 64 to 210 tex, the fiber diameter of the glass strands, D, is in the range of 9.0 to 18.0 μm, the ignition loss of the glass multiple-ply roving, L, is in the range of 0.55 to 0.94%, and the S, D, and L satisfy the formula (1) below, are excellent in workability in production of the random mat for a thermoplastic composite material, can ensure excellent impregnation quality of a thermoplastic resin in forming a thermoplastic composite material (glass fiber-reinforced thermoplastic resin sheet) by impregnating the random mat for a thermoplastic composite material with the thermoplastic resin, and can impart excellent strength to the thermoplastic composite material.

$$4.10 \le 1000 \times S^{1/2}/(D^3 \times L^3) \le 7.10 \tag{1}$$

In contrast to this, it is clear that the glass multiple-ply roving of Comparative Example 1, which is such that the weight of the glass strands, S, is 280 tex, which is more than 210 tex, and the value of $1000 \times S^{1/2}/(D^3 \times L^3)$ is 9.68, which is more than 7.10, and the glass multiple-ply roving of Comparative Example 2, which is such that the weight of the glass strands, S, is 34 tex, which is less than 64 tex, and the value of $1000 \times S^{1/2}/(D^3 \times L^3)$ is 3.37, which is less than 4.10, cannot achieve sufficient impregnation quality of a thermoplastic resin in forming a thermoplastic composite material by impregnating the random mat for a thermoplastic composite material with the thermoplastic resin.

It is clear that the glass multiple-ply roving of Comparative Example 3, which is such that the ignition loss, L, is 0.15%, which is less than 0.55%, and the value of $1000 \times S^{1/2}/(D^3 \times L^3)$ is 1038.76, which is more than 7.10, is poor in dispersibility in depositing on a belt conveyer after cutting the glass multiple-ply roving into fragments with a length in the above range, and poor in workability in production of the random mat for a thermoplastic composite material; and it is also clear that the glass multiple-ply roving of Comparative Example 3 cannot achieve sufficient impregnation quality of a thermoplastic resin in forming a thermoplastic composite material by impregnating the random mat for a thermoplastic composite material with the thermoplastic resin.

It is clear that the glass multiple-ply roving of Comparative Example 4, which is such that the ignition loss, L, is 1.30%, which is more than 0.94%, and the value of $1000 \times S^{1/2}/(D^3 \times L^3)$ is 1.60, which is less than 4.10, cannot achieve sufficient impregnation quality of a thermoplastic resin in forming a thermoplastic composite material by impregnating the random mat for a thermoplastic composite material with the thermoplastic resin.

The invention claimed is:

1. A glass multiple-ply roving comprising a plurality of glass strands, wherein a weight of the glass strands, S, is in a range of 93 to 210 tex, a fiber diameter, which is a diameter of a glass filament constituting the glass strands, D, is in a range of 9.0 to 18.0 μm, an ignition loss of the glass multiple-ply roving, L, is in a range of 0.55 to 0.94%, the S, D, and L satisfy the following formula (1), a weight of the glass multiple-ply roving is in a range of 1800 to 3400 tex, a number of the glass filament in the glass strands is in a range of 200 to 600, and a number of the glass strands in the glass multiple-ply roving is in a range of 24 to 50 such that a number of glass filaments constituting the glass multiple-ply roving is 4800 or more:

$$4.10 \leq 1000 \times S^{1/2}/(D^3 \times L^3) \leq 6.89 \tag{1}.$$

2. The glass multiple-ply roving according to claim 1, wherein the fiber diameter, D, is in a range of 13.5 to 17.5 μm.

3. The glass multiple-ply roving according to claim 1, wherein the glass multiple-ply roving has a length in a range of 1 to 150 mm and is used for production of a random mat for forming a thermoplastic composite material, the random mat comprising a thermoplastic resin.

4. A random mat for forming a thermoplastic composite material, the random mat comprising the glass multiple-ply roving according to claim 1, and a thermoplastic resin.

5. A glass fiber-reinforced thermoplastic resin sheet comprising the glass multiple-ply roving according to claim 1, and a thermoplastic resin.

* * * * *